(12) United States Patent
Cherry (10) Patent No.: US 6,493,446 B1
(45) Date of Patent: Dec. 10, 2002

(54) CALL CENTER POSTING PROGRAM

(75) Inventor: Richard S. Cherry, Miami, FL (US)

(73) Assignee: Willow CSN Incorporated, Miramar, FL (US)

( * ) Notice: Subject to any disclaimer, the term of this patent is extended or adjusted under 35 U.S.C. 154(b) by 0 days.

(21) Appl. No.: 09/311,097

(22) Filed: May 13, 1999

(51) Int. Cl.[7] .............................................. H04M 5/00
(52) U.S. Cl. ........................ 379/265.05; 379/265.01; 379/265.02; 379/265.04; 379/265.09
(58) Field of Search ................. 379/112.01, 112.06, 379/265.01, 265.02, 265.03, 265.04, 265.05, 265.09, 265.11, 265.12, 266.04, 266.05; 705/9

(56) References Cited

U.S. PATENT DOCUMENTS

| | | | |
|---|---|---|---|
| 4,400,587 A | | 8/1983 | Taylor et al. |
| 4,893,301 A | | 1/1990 | Andrews et al. |
| 5,144,653 A | | 9/1992 | Masuoka |
| 5,185,780 A | | 2/1993 | Leggett |
| 5,206,903 A | | 4/1993 | Kohler et al. |
| 5,291,550 A | * | 3/1994 | Levy et al. .................. 379/242 |
| 5,291,551 A | | 3/1994 | Conn et al. |
| 5,299,260 A | | 3/1994 | Shaio |
| 5,309,513 A | * | 5/1994 | Rose ..................... 379/265.12 |
| 5,392,345 A | | 2/1995 | Otto |
| 5,425,093 A | | 6/1995 | Trefzger |
| 5,459,780 A | | 10/1995 | Sand |
| 5,499,291 A | | 3/1996 | Kepley |
| 5,768,360 A | | 6/1998 | Reynolds et al. |
| 5,778,060 A | * | 7/1998 | Otto ....................... 379/266.09 |
| 5,815,666 A | | 9/1998 | Kurihara |
| 5,825,869 A | | 10/1998 | Brooks et al. |
| 6,005,932 A | * | 12/1999 | Bloom .................. 379/265.14 |
| 6,081,592 A | * | 6/2000 | Battle ......................... 379/309 |
| 6,278,978 B1 | * | 8/2001 | Andre et al. .................... 705/9 |
| 6,366,665 B1 | * | 4/2002 | Hymel et al. .......... 379/265.03 |

* cited by examiner

Primary Examiner—Ahmad F. Matar
Assistant Examiner—Bing Bui
(74) Attorney, Agent, or Firm—Lott & Friedland, P.A.

(57) ABSTRACT

A method of scheduling remotely located call center agents comprising the steps of connecting a call center client and a remotely located call center agent by telephonic and digital means. A posting server having a scheduling database is connected to a voice switch handling telephonic communications for the agent. A client-user terminal interface is utilized for posting one or more available time-slots in the scheduling database for accepting a customer-initiated telephone call. An agent-user terminal interface for displays the time-slots in the posting database to the agent who accepts one or more available time-slots through the agent-user terminal interface. The posting server then determines if the agent is authorized by the client to provide call center service and, if authorized, marks the time-slots accepted by the agent as unavailable.

17 Claims, 4 Drawing Sheets

CALL CENTER POSTING PROGRAM

RELATED APPLICATIONS

Reference is made to pending U.S. patent application Ser. No. 09/234,517, entitled: MULTIPLE CLIENT REMOTE AGENT NETWORK METHOD, which application was filed Jan. 25, 1999 and shares at least one common inventor with this application.

FIELD OF INVENTION

The present invention relates generally to call-center telecommunications and more particularly to a system for scheduling remote call-center agents for a plurality of call center clients.

BACKGROUND OF THE INVENTION

Call centers handle an increasing volume of telephonic inquiries for sales, information, customer support and other services. Typical call centers provide the ability to route a plurality of incoming, customer-initiated calls to call agents which provide sales, information, or support. An automatic call distributor ("ACD") is utilized to selectively route the incoming calls. An ACD generally refers to a device that receives incoming calls, answers with a taped announcement, holds the calls with background music or a message, then automatically assigns the call on a first come first serve basis to the next available call agent. However, newer ACD systems selective route the incoming calls based on various additional information such as the number of calls, the number of the caller, the geographic location of the caller, past caller data, and other relevant criteria. Once the ACD has evaluated the inbound caller's information, if any, the ACD then searches for an available call agent to service the call. The number of agents within the call center is often limited by the office space available for the agents to operate. A frequent problem experienced by call centers is the situation where there too few call agents to handle the number of incoming customer calls. In those situations, the customer is frequently put on hold and made to wait until a call agent becomes available. However, many potential customers, when faced with an extended wait, may simply terminate the call before the call center has the opportunity to conduct a business transaction, thereby causing an economic loss. Additionally, customers calling for support or information may become disgruntled or unsatisfied with a business that is unable to provide a sufficient number of call agents to service the call in a timely manner.

For most applications, an agent requires both a voice and data connection. The agent audibly communicates with the customer through a typical telephone line connection and records whatever transactions take place through a computer terminal networked to the call center's record system. Modern advancements in the field of electronics, computers and telecommunications have created standardized network protocols and hardware, yielding a constantly advancing global information infrastructure. Local area networks ("LANs") based in a single geographic location have given rise to wide area networks ("WANs") which efficiently interconnect information systems between large geographic distances. Both home and business computers currently sold offer integrated or optional components to communicate through standard networks including the Internet.

Many problems experienced in conventional call centers are rooted in the fact that operations are both physically and geographically confined. Large call centers may select a geographically attractive location only to find a limited workforce in that area. Large call centers typically pay for the training of their call agents and simultaneously experience a high turnover rate. Furthermore, should the customer initiated call exceed the capacity of the call center, physical expansion of the facilities is costly.

Hence there have been recent developments in the field of telecommunications to enable remote agents (sometimes called "home agents") to service overflow or regular customer initiated incoming calls. The benefits are obvious. Remote agents may work from home reducing the cost of maintaining large call center locations. The equipment and software needed to implement remote communications are widely available. Remote agents gain the benefit of forgoing commuting to a geographically distant office, avail themselves of flexible schedules, reduce the burden of reliance on child care or other similar circumstances. Furthermore, remote agent opportunities are particularly beneficial to persons with disabilities who may have special needs and require more flexible working conditions and schedules.

The present invention is directed to a system for coordinating, scheduling and evaluating a plurality of remotely located agents by a plurality of different call centers. The system provides a call center the ability to forecast and schedule its workload requirements utilizing home-based remotely located agents. Time slots are posted on the system so that remotely located agents may sign up for the available slots for accepting calls through a wide area network ("WAN").

An object of this invention is to provide a novel method for scheduling independent remotely located agents utilized by one or more call centers which share the remotely located agents.

Previous attempts have been made to provide scheduling and forwarding for call center agents such as described in U.S. Pat. No. 5,825,869 to Brooks et al. (the '869 patent); U.S. Pat. No. 5,499,291 to Kepley (the '291 patent); U.S. Pat. No. 5,459,780 to Sand (the '780 patent); U.S. Pat. No. 5,425,093 to Trefzger (the '093 patent); U.S. Pat. No. 5,392,345 to Otto (the '345 patent); U.S. Pat. No. 5,299,260 to Shaio (the '260 patent); U.S. Pat. No. 5,291,551 to Conn et al. (the '551 patent); U.S. Pat. No. 5,206,903 to Kohler et al. (the '903 patent); U.S. Pat. No. 5,185,780 to Leggett (the '780 patent); all of which are incorporate herein by reference.

U.S. Pat. No. 5,825,869 to Brooks et al. (the '869 patent) describes a call-management method and system for distributing calls to ACD agents comprising a customer telephone, a public switch, a connection between the public switch and a PBX, a series of ACD switching circuits within the PBX connected to a dynamic skills-based router, an agent telephone connected to the ACD switching circuits, whereby the dynamic skills-based router stores data referencing an individual agent's call handling capabilities. These capabilities may include technical knowledge, foreign language skills, or other such specialization. A skill level required for the call is evaluated and a priority level is placed on the call. The system attempts to correlate the skills needed with an appropriate agent in the database. However, if no agent with the appropriate skill level is available, then the system places the call in queue until the appropriate agent is available.

U.S. Pat. No. 5,499,291 to Kepley (the '291 patent) describes a call-management system for a call center comprising a plurality of terminals attended by agents. A call management system is controlled by an administrator and determines the work schedules for a plurality of call center agents by communications via an ACD PBX to their terminals or by voice to their headsets. The call management system also monitors the agent's adherence to the schedule for evaluation purposes.

U.S. Pat. No. 5,459,780 to Sand (the '780 patent) describes a work at home agent ACD comprising an ACD host switch, an agent switch, an intelligent agent workstation, a data network, a home agent server ("HAS"), a host processor, and a management information system ("MIS"), whereby call traffic routed through a PSTN is distributed by the ACD host switch to the agent switch and received by the workstation. The workstation receives voice signals from the agent switch and also transmits connection status, order processing, and other information via the data network to the HAS. The HAS transmits the data to a host processor which in turn communicates with the MIS which monitors the distribution traffic and controls the ACD host switch to optimize call distribution, particularly when caller traffic justifies maintaining an open voice path to the remote agent to reduce call setup time.

U.S. Pat. No. 5,425,093 to Trefzger (the '093 patent) describes an integrated ACD and automatic dialer system comprising one or more inbound trunks connected to a plurality of universal agents by an inbound switch. The inbound switch is connected to an inbound controller which interfaces with a data processor to access pre-existing caller information. An interface server compares the call frequency of an outbound switch with the call frequency in the inbound switch and directs universal agents to handle outbound calls during periods when inbound calls are less frequent. Conversely, during peak times of incoming calls, universal agents will be assigned to handle the inbound calls.

U.S. Pat. No. 5,392,345 to Otto (the '345 patent) describes an ACD system for both local and remote agents. A remote intelligent workstation receives voice calls from a switch and data from a data network. A home agent server monitors the remote agent activities. Data links carry event messages relating to the status of the workstation and application data such as order processing information. A logon connection is made by a data link to the server and the workstation connects to the server and determines whether the agent is logging on from a local or remote location. Both server and workstation confirm their respective availability and for accepting distributed inbound calls.

U.S. Pat. No. 5,299,260 to Shaio (the '260 patent) describes a system for automatically handling incoming telephone calls based on telephony information and agent performance criteria comprising a public telephone network ultimately connecting a plurality of callers to a plurality of agents within the setting of a single client or employer. Callers are matched against a host database by the number dialed, incoming line, the number of the caller or other telephony data. This information is analyzed by a call router controlled by a manager console whereby agent performance may be evaluated based on sales, efficiency or other factors. Furthermore, the call router may be configured to direct the first callers to the highest performing agents.

U.S. Pat. No. 5,291,551 to Conn et al. (the '551 patent) describes a home agent telecommunication system comprising one or more home agents having a voice terminal and a compute terminal to access a transaction processing center. The transaction-processing center may comprise a catalog order facility, a travel reservation entity, a stock brokerage, or the like. A customer call is received by a LEC which is routed to a PSTN and received by a second exchange which serves the geographic area encompassed by the transaction processing center. The transaction processing center designates the home agent assigned to receive the call which is routed across a combined voice and data line. The perceived benefit of this system is that the home agent is not continuously connected to the transaction processing center on a line that may remain idle much of the time.

U.S. Pat. No. 5,206,903 to Kohler et al. (the '903 patent) describes a system to route calls based on call-skill indicators that represent a particular need of the calling party. A call placed to the ACD is prioritized by first identifying the calls pending in a queue. If the caller at the head of the queue requires a certain skill, the system determines whether a call center agent possesses those skills. If the agent has the proper skills, the call is connected to that agent. However, if no agents are available with that skill level, the system evaluates whether the caller required a second skill. If an agent is found with the second skill, the call is connected to that agent. Thus, the system produces a loop to match the skills required by the caller, whether it is technical knowledge or language ability, to an agent with those required skills.

U.S. Pat. No. 5,185,780 to Leggett (the '780 patent) describes a method for predicting the number of agents required to provide service for a call center. The system comprises a central computer connected to a management information system ("MIS") which forms part of an ACD. The MIS receives real-time data from the ACD and stores this data in the MIS database. Data is delivered to the force management system database of the central computer in fifteen minute intervals. Agent schedules are delivered from the central computer back to the MIS to enable the MIS to determine adherence to the schedules. The centralized computer is linked to a plurality of workstations organized as groups into management units having one or more supervisor workstations associated with each group of agents therein. Each of the workstations includes a video display, a keyboard for enabling entry of orders and information, and a control circuit for communications between the terminal and the central computer via a communications link. The teams of agents are organized into management units and a forecast of expected caller activity is generated. The forecast is generally determined by past data correlating the same times and days of the week to predict a calling pattern. Next, an allocation of resources between management units is executed whereby the central computer distributes the responsibility for answering calls according to the forecast.

However, none of the inventions in the prior art describe a scheduling system for remotely located call center agents acting as independent contractors for at least one or more call center clients. An advantage of the independent agent is his or her ability to set their own schedule. However, this schedule must correspond to the needs of the call center clients. Additionally, some remotely located agents are training to handle calls for certain call centers, while they are untrained in others. Call center clients generally require remotely located agents to be authorized and validated to handle call traffic. Furthermore, when a schedule of available time-slots is posted to a large pool of remotely located agents, an unscrupulous agent may sign himself up for more time-slots than he can possibly handle then simple work whatever time-slots he later chooses. This creates a problem wherein accepted time-slots are no longer available to other agents. If the agent accepting the time-slot does not work, then the system is unable to provide the proper capacity to handle caller traffic.

Another problem occurs when an agent who is signed up for a particular time-slot is unable to fulfill his or her commitment at the last minute may not be able to cancel although another remote agent is available to handle the time-slot.

Another problem occurs when caller traffic exceeds the level forecasted by the client. In these cases, a large number of remotely located agents who could not obtain a time-slot sit idle when, in fact, they could be utilized on short notice.

Consequently, there is a need in the art for a method to schedule remotely located call center agents based on forecasted call traffic by a call center client.

There is a further need in the art for a method to validate which agents are authorized to accept time-slots for any particular client.

There is a further need in the art for a method to provide a threshold limit to the total number of hours a remotely located agent can sign up for time-slots.

There is a further need in the art for a method for one agent to release a scheduled time-slot to another agent should the first agent be unable to fulfil his or her commitment.

There is a further need in the art for a method to audit compliance of an agent's commitment to work scheduled time-slots.

There is a further need in the art for a communications method to notify idle agents of available time-slots due to non-compliance of a previously scheduled agent or unexpected caller activity.

SUMMARY OF THE INVENTION

The present invention solves significant problems in the art by providing a method of scheduling automatic call distribution (ACD) service to one or more remotely located agents trained to service calls for a plurality of client call centers, comprising the steps of connecting a call center client to one or more call center agents by telephonic and digital means and networking a scheduling server to the client and agents. The server provides access to a scheduling database to which the client posts one or more time-slots for accepting a customer-initiated call. Agents then reserve the time-slots to handle caller activity.

Generally described, the invention comprises the steps of connecting a call center client and one or more remotely located call center agent by telephonic and digital means. The telephonic means may comprises regular telephone service, ISDN, OPX or any other comparable technology. The digital connection may comprise ADSL, cable modem, ATM, ISDN, analog modem, or any other comparable technology. In a preferred embodiment, the method utilizes a client-server architecture wherein a scheduling server processes a scheduling database containing information on upcoming workload schedules and remote agent information. The server is preferably maintained by a third party network database which also provides access to the server for a plurality of client call centers, thereby lowering the costs to each individual client call center. The server is also linked to a voice switch handling telephonic communications for the agent. The preferred switch is a Nortell® DMS 100 providing the ability to silently monitor caller transactions as well as to determine when an agent is logged onto the system and handling call traffic.

A client-user terminal interface is provided for posting one or more available time-slots in the scheduling database for accepting a customer-initiated telephone call. The client then forecasts the quantity of call traffic expected for a period of time and then posts one or more time-slots in the scheduling database for remote agents to accept customer-initiated telephone calls.

The remote agent is also provided an agent-user terminal interface for displaying the time-slots in said scheduling database to said agent whereby the remote agent may accept one or more available time-slots. In a preferred embodiment, before each agent may accept a time-slot, the agent is validated to determine whether the agent is authorized by the client to provide call center service. This step insures that agents handling the call traffic are properly qualified and trained to process orders. Once the agent's credentials have been validated, the time-slot is marked unavailable unless later released by the agent.

An additional step of validating the agent has not exceeded a preset threshold for accepting time-slots may be performed to insure that agents to not horde time-slots they do not intend to work. However, time-slot transferability may be provided for a first agent to release a reserved time-slot to a second agent to handle caller activity which insures that time-slots are covered in the event that the first agent unexpectedly becomes unable to work the time-slot.

In order to ensure that each agent complies with their scheduling commitments, a caller log may be maintained by monitoring the agent's caller activity through the voice switch. The log is then referenced against the scheduling database and the compliance of the agent is stored in a user file.

When a large number of remote agents desire to schedule time-slots at the same time, a number of methods may be employed to insure the network is not overloaded and that time-slots are accessible to agents in a fair manner. One method comprises the step of providing a right-of-first-refusal to client-designated agents for said time-slots. For example, a group of particular remote agents may become known to the call center client as highly productive, reliable and professional. The call center client may wish these agents to have the first chance to secure an available time-slot. This right-of-first-refusal may be time limited wherein the preferred agents may have several hours or several days to accept the time-slots. Thereafter, any qualified remote agent may begin to accept the available time-slots.

An alternative method may be employed wherein remote agents who consistently work the same time-slot may be provided with a right-of-first-refusal in order to gain the reliability of those particular agents and to reward the agents with the security they will have that employment opportunity open to them on a regular basis.

Another alternative method may be employed, particularly when a large number of qualified agents aggressively attempt to secure open time-slots. For example, if a particularly lucrative array of time-slots open to a large number of remote agents, there is a danger that the scheduling server may be overloaded. Furthermore, it may become stressful to many agents if they are required to "race" for time-slots. Therefore, in order to provide a level playing field, a random selection of a subset of the qualified agents are provided a right-of-first-refusal to the time-slots. If any time-slots are left over after the first round, a second subset of agents are again randomly selected until all the time-slots are filled.

At times, call center clients may required additional remote agents to work on short notice. This may be a result of unexpected call volume or agents who signed up for time-slots who are not logged on. The increased call volume is determined by the calling queue at the voice switch. For example, should a preset number of customer callers be in a holding queue, the voice switch sends a socket message to the scheduling server. The scheduling server then may send a notification for any non-scheduled agent to handle calls. The notification may consist of email, interactive voice response messages, a terminal pop-up box or any similar means. Notification sent by email may delineate the time-slots open and prompt for a reply or simply note that the time-slots are available through the regularly used scheduling interface. A terminal pop-up box may comprise a standard message dialog box on the agent-user interface wherein the box appears modally to notify the user of available time-slots. Notification sent by interactive voice response may comprise a pre-recorded message delivered telephonically regarding the available time slots sent to each qualified idle agent. The agent is then prompted to depress a key on a touch-tone telephone to accept or decline. The depressed key registers a dual tone multi-frequency signal back to the scheduling server which processes the input accordingly. For idle agents not answering their telephone, the server assumes the agent declined.

Accordingly, it is an object of the present invention to schedule remotely located call center agents based on forecasted call traffic by a call center client.

It is another object of the present invention to validate which agents are authorized to accept time-slots for any particular client and provide a threshold limit to the total number of hours a remotely located agent can sign up for time-slots.

It is another object of the present invention to provide a method to release a scheduled time-slot to another agent should the first agent be unable to fulfil his or her commitment and to provide a method wherein one or more agents may gain preferred access to scheduling, or alternatively, randomizing access to scheduling to ensure every agent has an equal opportunity to work various time-slots.

It is another object of the present invention to audit compliance of an agent's commitment to work scheduled time-slots and to notify idle agents of available time-slots due to non-compliance of a previously scheduled agent or unexpected caller activity.

An advantage of the invention is that client call centers have the ability to access a large pool of highly qualified remote agents and schedule them for anticipated call volume. Another advantage of the invention is that should call volume unexpectedly increase, additional agents may be notified and brought online to handle the calls without addition infrastructure costs and expense. Another object of the invention is that remote agents may conveniently schedule their work hours to accommodate their personal commitments and should circumstances inhibit their ability to work certain hours, the remote agents may release scheduled time-slots to each other without placing the scheduling burden on the client call center.

DETAILED DESCRIPTION OF THE PREFERRED EMBODIMENT

Figure 1:
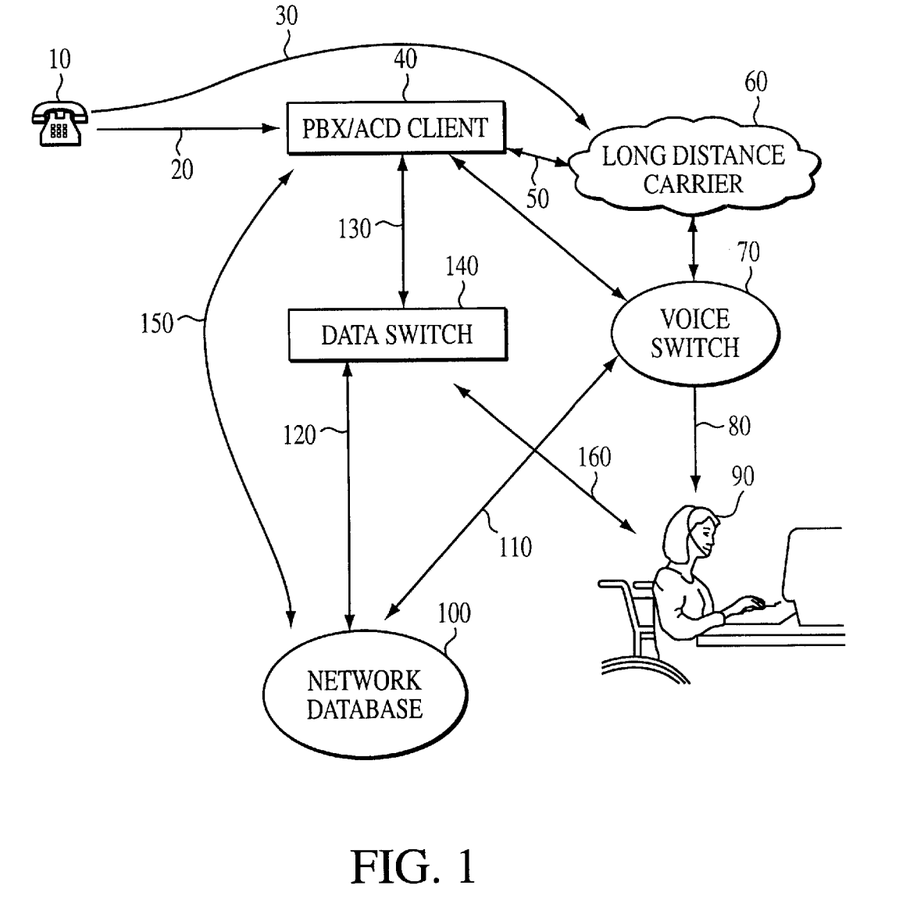
FIG. 1 is a flow diagram of the operation of applicant's invention illustrating the general telecommunication pathways.

Referring initially to FIG. 1 of the drawings, in which like numerals indicate like elements throughout the several views, in a preferred embodiment a customer-initiated telephone call 10 may travel by local lines 20 to a call center client 40. The call center client 40 typically has an existing automatic call distributor ("ACD") and private branch exchange ("PBX") system that has the ability to transfer overflow calls to remote locations. A PBX is a telephone system within an enterprise that switches calls between enterprise users on local lines while allowing all users to share a certain number of external phone lines. Most PBX switches also have the ability to be networked together via leased lines. This allows remote offices to be "tied" together reducing call traffic and producing substantial long distance rate savings.

Overflow calls from the call center client 40 may be forwarded to a long distance carrier 60 by a second connection 50. The second connection 50 may comprise a high-bandwidth data connection such as a 1.544 Mb/s T-1, 45 Mb/s T-3, 800 service, or comparable connection. Alternatively, the customer-initiated call 10 may bypass the call center client 40 altogether and connect directly to a voice switch 70. Overflow calls routed through the call center client 40 also connect to the voice switch 70. In a preferred embodiment, the voice switch 70 comprises a central office switching center, such as the Norte® DMS 100, that serves the local level public switching network. Also called a Class 5 end office, the voice switch is operated by local exchange carriers ("LECs") and is designed for end office use.

The voice switch 70 is connected to a network database 100. The network database 100 maintains a live database of all the available remote agents 90 trained and authorized to service calls for the particular call center client 40. The remote agent 90 provides predetermined blocks of time for which her or she is available to receive calls. The call center client 40 estimates the number of remote agents needed to service calls for a particular time slot and the network database 100 schedules a corresponding number of remote agents 90 to fill the requirement. The network database 100 is integrally tied to every transaction as the remote agents 90 are paid on a per-call basis. In a preferred embodiment, the network database 100 assembles payroll information as a service to the call center client 40, who in turn compensates the remote agent 90 for their services.

The direct connection between the network database 100 and the voice switch 70 enables the network database to provide seamless supervisory monitoring of the calls without "clicking" sounds known in other systems. Furthermore, the network database 100 may provide this "silent monitoring" to the call center client 40 to enable the client to evaluate the verbal transactions that take place between the remote agent 90 and the customer 10. The direct connection to the voice switch 70 enables either the network database 100 or the call center client 40 to provide supervisory assistance to the remote client 90 as needed. The network database 100 may also provide real-time call statistics to the call center client 40 to evaluate the performance of the remote agent 90. In a preferred embodiment of the invention, the remote agent 90, the network database 100 and the call center client 40 have real-time email or electronic chat capability so that information may be distributed without interrupting any ongoing voice connections.

The telecommunication connections to and from the remote agent 90 are well known within the industry. In a preferred embodiment, voice communications 160 between the voice switch 70 and the remote agent 90 are established by an off premises extension ("OPX"). An OPX generally refers to any telephone extension not located on the same premise as the telephone system of which it is a part. A data connection 160 between the remote agent 90 and a data switch 140 continues on through a data path 130 to the client for caller transaction information and email. In a preferred embodiment, the data path 160 may utilize POTS or ISDN depending on the bandwidth requirements and available equipment. The data path 130 between the data switch 140 and the call center client 40 is best established using a data frame relay. Frame relay is a telecommunication service designed for cost-efficient data transmission for intermittent traffic between LANs and between end-points in a WANs. Frame relay puts data in a variable-size unit called a frame and leaves any necessary error correction (retransmission of data) up to the end-points, which speeds up overall data transmission.

Because the remote agent 90 may service calls for a plurality of call centers, it is preferable that the network database 100 provide payroll support for the multiple call center clients serviced by the remote agent 90. The network database 100 inherently monitors the call status, duration, availability and other information relating to the remote agent 90. This information may be compiled for accounting on a per-call basis, hourly basis, sales basis or whichever method of compensation is agreed upon. The payroll information may be directly delivered 150 from the network database 100 to the call center client 40.

Figure 2:
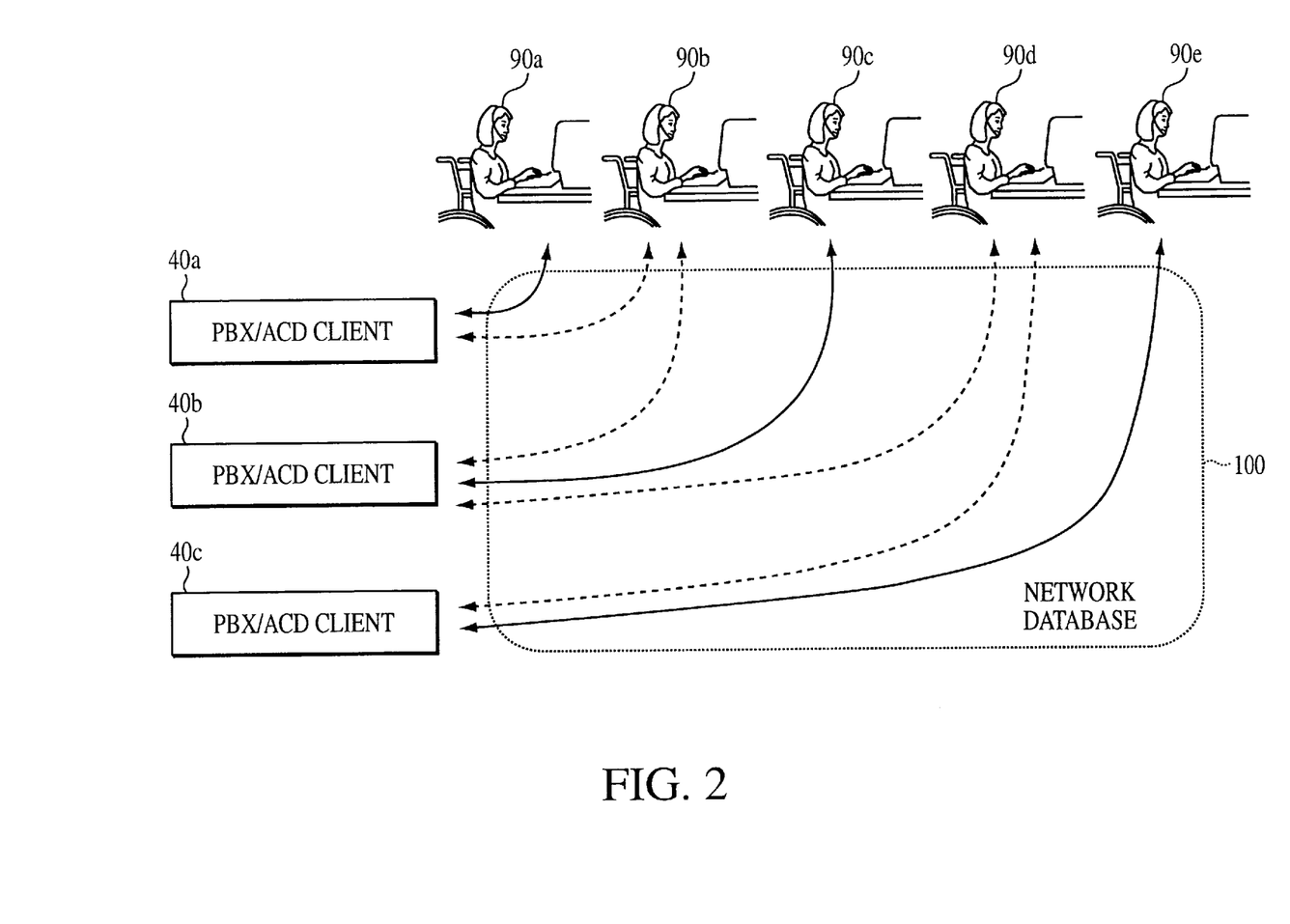
FIG. 2 is a flow diagram of the operation of the applicant's invention illustrating the multi-client servicing design of the network.

FIG. 2 is illustrative of the operation of the system whereby multiple call center clients 40a–c are serviced by a plurality of remote agents 90a–e. As an example, remote agent 90b is trained and authorized to service calls from both call center client 40a and call center client 40b. Remote agent 90b is scheduled to work from 4:00 p.m. to 6:00 p.m. for call center client 40a. The schedule of remote agent 90b is registered with the network database 100 whereby only authorized and scheduled remote agents may log on to the system to accept calls. The number of remote agents assigned to handle calls is predetermined by the call center client based on anticipated needs. However, suppose that in the example, remote agent 90b finds that call center client 40a overestimated its need for remote agents and remote agent 90b is idle. The network database 100 may determine that call center client 40b requires additional assistance than previously forecasted. The network database 100 then confirms that remote agent 90b has been trained and authorized to handle calls for call center client 40b and that the remote agent is idle. The network database 100 then sends email to remote agent 90b offering a switch to accept customer-initiated calls for call center client 40b. The remote agent 90b may then automatically switch over and begin accepting calls for call center client 40b.

In a preferred embodiment of the invention, the remote agents are paid on a per-call basis. This structure encourages them to actively seek out high volume work throughout the system managed by the network database. Additionally, because the remote agents are paid for each call, the system encourages them to train and qualify to handle multiple call center clients. This benefit is returned to the call center client who gain a large pool of remote agents that may be activated on an ad hoc basis.

Referring back to FIG. 2, remote agents 90a, 90c, and 90e are trained and authorized to accept calls, designated by a solid line, only to a single call center client 40. However, remote agents 90b and 90d are trained and authorized to accept calls, designated by dashed lines, to multiple call center clients. By the implementation of the multiple client remote agent network method, the call center clients 40a–c greatly expand the size and capacity of their workforce with little to no additional expense. Simultaneously, the remote agents greatly expand their employment opportunities and work schedules by working for multiple call center clients who are competing for their services.

Figure 3:
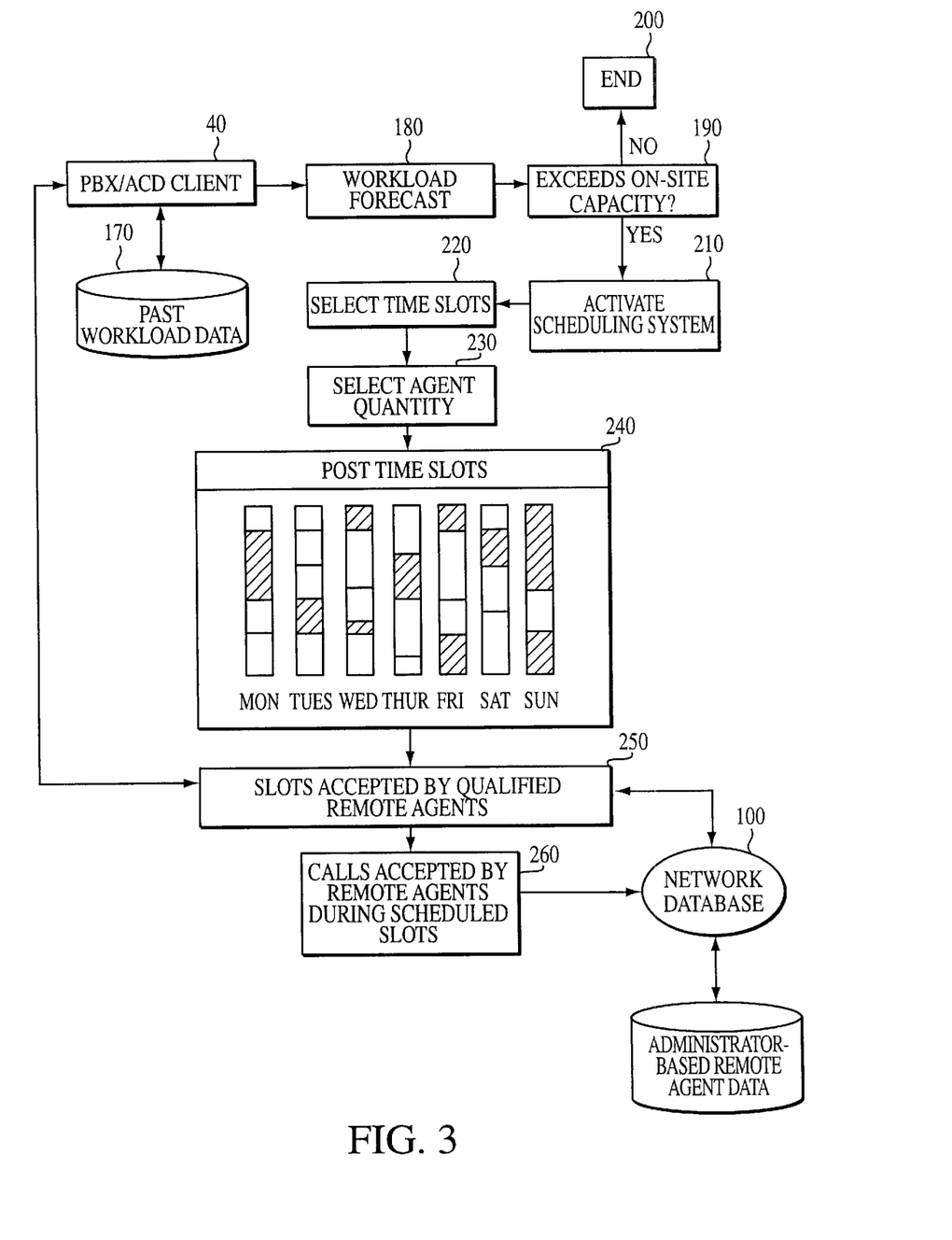
FIG. 3 is a flow diagram of the scheduling method according to the invention.

FIG. 3 illustrates the scheduling method wherein the call center client 40 accesses past workload data 170 to resolve a workload forecast 180 of expected caller volume for a number of variables. These variables may include day of the week, holidays, time of day and other factors that determine how many customer-initiated telephone calls are received for a given period of time. The workload forecast 180 is then compared to the on-site capacity 190 of call center agents. Should sufficient regular on-site call center agents exist to handle the workload, the process ends 200. However, if the on-site capacity cannot meet the anticipated call volume, the schedule system is activated 210 by the call center client 40. The call center client accesses a client-user computer interface to select the time-slots needed 220 and the number of remotely located agents required 230 to meet the anticipated caller volume. The time-slots are then posted 240 online through a communications link with remotely located agents. Remote agents who have been trained and authorized to accept customer-initiated calls for the client then accept the posted time-slots 250 and caller activity and remote agent activity are monitored by the network database 100 while calls are accepted by the remote agents during schedule time-slots 260.

Figure 4:
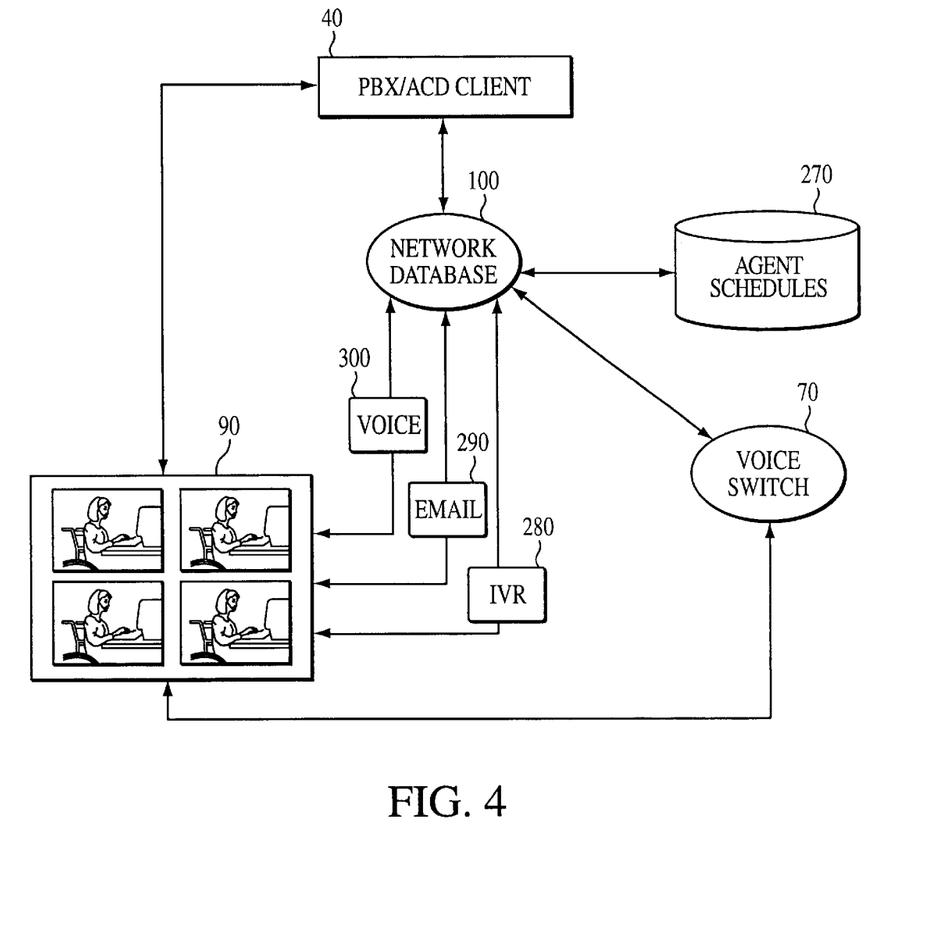
FIG. 4 is a flow diagram of the scheduling method illustrating a plurality of notification pathways to the remotely located call center agents.

FIG. 4 illustrates a dynamic method of scheduling remotely located agents wherein the client 40 accesses agent schedules 270 through the network database 100. The agent schedules 270 are accessible by both the client 40 and the network database 100. The network database is also linked to the voice switch 70 that provides the communication pathway for the remotely located agents 90 and the call center customer. The network database 100 receives real-time statistics on agent activity from the voice switch 70 and determines if the remotely located agents 90 are logged in during their scheduled time by comparing activity retrieved from the voice switch 70 against the agent schedules 270. This method allows the network database 100 and, in turn, the call center client 40 to determine if an agent is complying with his or her scheduled time-slots. This method also permits the network database 100 to determine from the voice switch 70 if a predetermined number of call center customers are warning in a hold queue. If this is the case, a socket message is sent from the voice switch 70 to the network database 100 which in turn may issue notifications to one or more idle agents that additional help is needed answering calls. These notifications may include interactive voice response ("IVR") 280, email 290, or regular voice communication 300. Regular voice communications 300 may be used to issue a prerecorded message to the telephone number of the remotely located agent 90 to advise them that assistance is needed for call overflow should they wish to work. Alternatively, email 290 may be sent to the remotely located agent 90 advising them of the work opportunity. Finally, in an interactive voice response 280 may be used to dial the remote agent's 90 telephone number, play a prerecorded message regarding the need for assistance and then prompt the remotely located agent 90 to depress a key on their touch-tone telephone to accept or decline the invitation. The resulting dual tone multi-frequency signal is then received by the network database 100 which instructs the voice switch 70 to begin forwarding queued calls to the accepting non-scheduled agent 90. Should the IVR receive no response, the agent is deemed to decline to work.

Accordingly, it will be understood that the preferred embodiment of the present invention has been disclosed by way of example and that other modifications and alterations may occur to those skilled in the art without departing from the scope and spirit of the appended claims.

What is claimed is:

1. A call center scheduling method comprising the steps of:
   connecting a call center client and a remotely located call center agent by telephonic and digital means;
   connecting a scheduling server having a scheduling database to a voice switch handling telephonic communications for said agent;
   providing a client-user terminal interface for posting one or more available time-slots in said scheduling database for accepting a customer-initiated telephone call;
   posting one or more time-slots in said scheduling database for accepting said customer-initiated telephone call on said scheduling server by said client;
   providing an agent-user terminal interface for displaying said time-slots in said scheduling database to said agent;
   accepting one or more available time-slots by said agent through said agent-user terminal interface;
   validating said agent is authorized by said client to provide call center service; and
   marking time-slots accepted by said agent as unavailable.

2. A call center scheduling method as described in claim 1, further comprising the step of validating said agent has not exceeded a preset hourly threshold for accepting time-slots.

3. A call center scheduling method as described in claim 1, further comprising the step of providing time-slot transferability for a first agent to release a reserved time-slot to a second agent to handle caller activity.

4. A call center scheduling method as described in claim 1, further comprising the steps of monitoring said agent's caller activity through said voice switch;
   referencing said activity against said scheduling database through said voice switch; and
   recording the compliance of said agent with said scheduling database in a user file.

5. A call center scheduling method as described in claim 1, further comprising the step emailing a notification to a non-scheduled agent of an open time-slot due to non-compliance of a previously scheduled agent.

6. A call center scheduling method as described in claim 1, further comprising the step emailing a notification to non-scheduled agents of time-slot availability due to increased customer-initiated caller activity.

7. A call center scheduling method comprising the steps of:
   connecting a call center client and one or more remotely located call center agent by telephonic and digital means;
   connecting a scheduling server having a scheduling database to a voice switch handling telephonic communications for said agent;
   providing a client-user terminal interface for posting one or more available time-slots in said scheduling database for accepting a customer-initiated telephone call;
   posting one or more time-slots in said scheduling database for accepting said customer-initiated telephone call on said scheduling server by said client;
   providing an agent-user terminal interface for displaying said time-slots in said scheduling database to said agent;
   providing a right-of-first-refusal to client-designated agents for said time-slots;
   providing a first alternate right-of-first-refusal to agents for said time-slots, said agents having previously worked the same time-slot on one or more prior occasions;
   randomly providing a second alternate right-of-first-refusal to subsets of agents for said time-slots until all time-slots are accepted;
   accepting one or more available time-slots by said agent though said agent-user terminal interface;
   validating said agent is authorized by said client to provide call center service;
   validating said agent has not exceeded a preset hourly threshold for accepting time-slots;
   providing time-slot transferability for a first agent to release a reserved time-slot to a second agent to handle caller activity;
   marking time-slots accepted by said agent as unavailable;
   monitoring said agent's caller activity through said voice switch;
   referencing said activity against said scheduling database through said voice switch;
   recording the compliance of said agent with said scheduling database in a user file;
   emailing a notification to a non-scheduled agent of an open time-slot due to non-compliance of a previously scheduled agent or increased customer-initiated caller activity;
   sending an interactive voice response notification to a non-scheduled agent of an open time-slot due to non-compliance of a previously scheduled agent or increased customer-initiated caller activity;
   prompting said non-scheduled agent to accept or decline said open time-slot;
   recording a dual tone multi-frequency response from said non-scheduled agent; and
   scheduling said non-scheduled agent to receive calls in the event of acceptance.

8. A call center scheduling method comprising the steps of:
   connecting a call center client and a remotely located call center agent by telephonic and digital means;
   connecting a scheduling server having a scheduling database to a voice switch handling telephonic communications for said agent;
   providing a client-user terminal interface for posting one or more available time-slots in said scheduling database for accepting a customer-initiated telephone call;
   posting one or more time-slots in said scheduling database for accepting said customer-initiated telephone call on said scheduling server by said client;
   providing an agent-user terminal interface for displaying said time-slots in said scheduling database to said agent;
   providing a right-of-first-refusal to client-designated agents for said time-slots;
   accepting one or more available time-slots by said agent through said agent-user terminal interface;
   validating said agent is authorized by said client to provide call center service; and
   marking time-slots accepted by said agent as unavailable.

9. A call center scheduling method as described in claim 8, further comprising the step of validating said agent has not exceeded a preset hourly threshold for accepting time-slots.

10. A call center scheduling method as described in claim 8, further comprising the step of providing time-slot transferability for a first agent to release a reserved time-slot to a second agent to handle caller activity.

11. A call center scheduling method as described in claim 8, further comprising the steps of monitoring said agent's caller activity through said voice switch;
referencing said activity against said scheduling database through said voice switch; and
recording the compliance of said agent with said scheduling database in a user file.

12. A call center scheduling method as described in claim 8, further comprising the step of emailing a notification to a non-scheduled agent of an open time-slot due to non-compliance of a previously scheduled agent.

13. A call center scheduling method as described in claim 8, further comprising the step of emailing a notification to non-scheduled agents of time-slot availability due to increased customer-initiated caller activity.

14. A call center scheduling method comprising the steps of:
connecting a call center client and a remotely located call center agent by telephonic and digital means;
connecting a scheduling server having a scheduling database to a voice switch handling telephonic communications for said agent;
providing a client-user terminal interface for posting one or more available time-slots in said scheduling database for accepting a customer-initiated telephone call;
posting one or more time-slots in said scheduling database for accepting said customer-initiated telephone call on said scheduling server by said client;
providing an agent-user terminal interface for displaying said time-slots in said scheduling database to said agent;
providing a right-of-first-refusal to agents for said time-slots, said agents having previously worked the same time-slot on one or more prior occasions;
accepting one or more available time-slots by said agent through said agent-user terminal interface;
validating said agent is authorized by said client to provide call center service; and
marking time-slots accepted by said agent as unavailable.

15. A call center scheduling method comprising the steps of:
connecting a call center client and a remotely located call center agent by telephonic and digital means;
connecting a scheduling server having a scheduling database to a voice switch handling telephonic communications for said agent;
providing a client-user terminal interface for posting one or more available time-slots in said scheduling database for accepting a customer-initiated telephone call;
posting one or more time-slots in said scheduling database for accepting said customer-initiated telephone call on said scheduling server by said client;
providing an agent-user terminal interface for displaying said time-slots in said scheduling database to said agent;
providing a right-of-first-refusal to subsets of agents for said time-slots until all time-slots are accepted;
accepting one or more available time-slots by said agent through said agent-user terminal interface;
validating said agent is authorized by said client to provide call center service; and
marking time-slots accepted by said agent as unavailable.

16. A call center scheduling method comprising the steps of:
connecting a call center client and a remotely located call center agent by telephonic and digital means;
connecting a scheduling server having a scheduling database to a voice switch handling telephonic communications for said agent;
providing a client-user terminal interface for posting one or more available time-slots in said scheduling database for accepting a customer-initiated telephone call;
posting one or more time-slots in said scheduling database for accepting said customer-initiated telephone call on said scheduling server by said client;
providing an agent-user terminal interface for displaying said time-slots in said scheduling database to said agent;
accepting one or more available time-slots by said agent through said agent-user terminal interface;
validating said agent is authorized by said client to provide call center service;
marking time-slots accepted by said agent as unavailable;
sending an interactive voice response notification to a non-scheduled agent of an open time-slot due to non-compliance of a previously scheduled agent;
prompting said non-scheduled agent to accept or decline said open time-slot;
recording a dual tone multi-frequency response from said non-scheduled agent; and
scheduling said non-scheduled agent to receive calls in the event of acceptance.

17. A call center scheduling method comprising the steps of:
connecting a call center client and a remotely located call center agent by telephonic and digital means;
connecting a scheduling server having a scheduling database to a voice switch handling telephonic communications for said agent;
providing a client-user terminal interface for posting one or more available time-slots in said scheduling database for accepting a customer-initiated telephone call;
posting one or more time-slots in said scheduling database for accepting said customer-initiated telephone call on said scheduling server by said client;
providing an agent-user terminal interface for displaying said time-slots in said scheduling database to said agent;
accepting one or more available time-slots by said agent through said agent-user terminal interface;
validating said agent is authorized by said client to provide call center service;
marking time-slots accepted by said agent as unavailable;
sending an interactive voice response notification to a non-scheduled agent of time-slot availability due to increased customer-initiated caller activity;
prompting said non-scheduled agent to accept or decline said open time-slot;
recording a dual tone multi-frequency response from said non-scheduled agent; and
scheduling said non-scheduled agent to receive calls in the event of acceptance.

* * * * *